(12) United States Patent
Lee

(10) Patent No.: US 12,239,117 B2
(45) Date of Patent: Mar. 4, 2025

(54) FISHING BAG

(71) Applicant: Seuk Jong Lee, Seoul (KR)

(72) Inventor: Seuk Jong Lee, Seoul (KR)

(*) Notice: Subject to any disclaimer, the term of this patent is extended or adjusted under 35 U.S.C. 154(b) by 2 days.

(21) Appl. No.: 18/044,322

(22) PCT Filed: Jul. 5, 2021

(86) PCT No.: PCT/KR2021/008469
§ 371 (c)(1),
(2) Date: Mar. 7, 2023

(87) PCT Pub. No.: WO2022/050548
PCT Pub. Date: Mar. 10, 2022

(65) Prior Publication Data
US 2023/0329208 A1 Oct. 19, 2023

(30) Foreign Application Priority Data
Sep. 7, 2020 (KR) .................. 10-2020-0114031

(51) Int. Cl.
*A01K 97/08* (2006.01)
(52) U.S. Cl.
CPC .................... *A01K 97/08* (2013.01)
(58) Field of Classification Search
CPC .............. A01K 97/06; A01K 97/08
See application file for complete search history.

(56) References Cited

U.S. PATENT DOCUMENTS

| | | | | |
|---|---|---|---|---|
| 3,033,259 A | * | 5/1962 | Landis, Sr. | A01K 97/08 206/315.11 |
| D268,547 S | * | 4/1983 | Ruckstuhl | D3/260 |
| 5,277,306 A | * | 1/1994 | Sargent | A01K 97/08 206/315.11 |
| 5,327,669 A | * | 7/1994 | Lannan | A01K 97/08 206/315.11 |

(Continued)

FOREIGN PATENT DOCUMENTS

| JP | 2017-12106 A | 1/2017 |
|---|---|---|
| KR | 10-2010-0029395 A | 3/2010 |

(Continued)

OTHER PUBLICATIONS

International Search Report dated Oct. 18, 2021 in International Application No. PCT/KR2021/008469.

*Primary Examiner* — Michael H Wang
(74) *Attorney, Agent, or Firm* — Saliwanchik, Lloyd & Eisenschenk

(57) ABSTRACT

Proposed is a fishing bag for inhibiting a plurality of fishing rods from being broken due to collisions therebetween. The fishing bag includes a fishing bag divided into a first body and a second body, that have accommodation spaces in which a fishing rod handle and a fishing rod guide are inserted, respectively, and are hingedly opened and closed, a fishing rod handle pouch detachably provided in the first body and storing the fishing rod handle therein, and a fishing rod guide pouch detachably provided in the second body and storing the fishing rod guide therein. The fishing rod handle pouch and the fishing rod guide pouch can be easily opened and closed with one hand through the elasticity of an opening/closing member, so the convenience of use is provided.

3 Claims, 7 Drawing Sheets

(56) References Cited

U.S. PATENT DOCUMENTS

| | | | | |
|---|---|---|---|---|
| 5,394,638 | A * | 3/1995 | Raymond | A01K 97/06 43/57.1 |
| 6,022,144 | A * | 2/2000 | Hausslein | B65D 33/30 383/89 |
| 6,283,288 | B1 * | 9/2001 | Rich | A01K 97/06 206/315.11 |
| 6,612,741 | B1 * | 9/2003 | Horne | B65D 33/007 383/43 |
| 8,443,579 | B2 * | 5/2013 | Phillips | B65D 85/42 53/399 |
| 10,660,428 | B2 * | 5/2020 | Moreau | A45F 5/021 |
| 11,730,157 | B1 * | 8/2023 | Zieg | A01K 97/08 43/21.2 |
| 2018/0192628 | A1 * | 7/2018 | Burts | A45F 3/14 |
| 2019/0297867 | A1 * | 10/2019 | Yowell | A01K 97/08 |
| 2020/0282917 | A1 * | 9/2020 | Sagen | A01K 97/08 |

FOREIGN PATENT DOCUMENTS

| | | |
|---|---|---|
| KR | 10-2011-0105684 A | 9/2011 |
| KR | 10-2018-0094376 A | 8/2018 |

* cited by examiner

FISHING BAG

CROSS-REFERENCE TO RELATED APPLICATIONS

This application is the U.S. national stage application of International Patent Application No. PCT/KR2021/008469, filed Jul. 5, 2021, which claims the benefit under 35 U.S.C. § 119 of Korean Application No. 10-2020-0114031, filed Sep. 7, 2020, the disclosures of each of which are incorporated herein by reference in their entirety.

TECHNICAL FIELD

The present disclosure relates generally to a fishing bag and, more particularly, to a fishing bag capable of inhibiting damage to a fishing rod during storage of the fishing rod and conveniently storing the fishing rod during movement of the fishing bag.

BACKGROUND ART

According to data recently announced by the Ministry of Oceans and Fisheries of Korea, as of 2018, the fishing population in Korea reached 8.5 million, and the scale of the fishing industry reached 2.4 trillion, so fishing has become a leisure activity enjoyed by many people.

Since fishing tackle such as reels, baits, and fishing rods are essential for fishing, fishing bags are often used to carry such fishing tackle. Recently, widely used are fishing bags made of plastic, cloth, artificial leather, etc., and are opened and closed through a locking device such as a zipper provided in a longitudinal direction. The fishing bag is used by opening the bag and taking out a fishing rod while the bag is laid down.

However, this method is inconvenient to use because a user has to lay the fishing bag on flat ground, fully open the locking device, and then take out the fishing rod for use.

In an effort to solve this problem, Korean Utility Model Registration No. 20-0227052 (hereinafter referred to as "cited invention") discloses a method of installing a separate auxiliary storage room inside a bag so that a rod tip is stored separately. Each fishing rod is stored in a disassembled state inside the bag.

However, in the cited invention, since a plurality of fishing rods are stored together in a space other than the auxiliary storage room, there is a possibility that the fishing rods may collide with each other and be damaged during movement of the bag.

DISCLOSURE

Technical Problem

Accordingly, the present disclosure has been made keeping in mind the above problems occurring in the related art, and an objective of the present disclosure is to provide a fishing bag for inhibiting a plurality of fishing rods from being broken due to collisions therebetween by providing a fishing rod handle pouch and a fishing rod guide pouch that are mounted inside the fishing bag and have accommodation spaces in which a fishing rod handle and a fishing rod guide are inserted and stored, respectively.

Technical Solution

In order to accomplish the above objective, the present disclosure provides a fishing bag including: a fishing bag divided into a first body and a second body that are configured to be hingedly opened and closed; a fishing rod handle pouch detachably provided in the first body and configured to store a fishing rod handle therein; and a fishing rod guide pouch detachably provided in the second body and configured to store a fishing rod guide therein. The first body and the second body may be coupled to each other by a magnetic force.

Furthermore, the first body and the second body may be provided with respective connection members to which the fishing rod handle pouch and the fishing rod guide pouch are coupled, respectively. Each of the connection members may have a bar shape with a plurality of openable coupling rings provided at predetermined intervals along a longitudinal direction thereof. A plurality of coupling holes into which the plurality of coupling rings are inserted may be formed along one side edge of each of the fishing rod handle pouch and the fishing rod guide pouch.

Furthermore, an opening/closing member may be provided on at least one end of each of the fishing rod handle pouch and the fishing rod guide pouch so that an opening of each of the fishing rod handle pouch and the fishing rod guide pouch is opened and closed with one hand. The opening/closing member may include an elastic iron plate having elasticity, a plastic magnet, and a magnet so that the opening is opened when opposite sides of the opening/closing member are pressed by pressing force and the opening is closed when the pressing force is released.

Advantageous Effects

A fishing bag according to the present disclosure is divided into a first body and a second body that are hingedly opened and closed and in which a fishing rod guide pouch and a fishing rod handle pouch are stored. Thus, even when the fishing bag is standing upright, a user can take out and use a fishing rod by opening the fishing rod guide pouch and the fishing rod handle pouch through an opening/closing member provided at one end of each of the fishing rod guide pouch and the fishing rod handle pouch.

In addition, the user can open or close the fishing rod guide pouch and the fishing rod handle pouch with one hand through the opening/closing member, so the convenience of storage can be increased.

BEST MODE

The present disclosure proposes a fishing bag for inhibiting a plurality of fishing rods from being broken due to collisions therebetween, and including: a fishing bag divided into a first body and a second body that have accommodation spaces in which a fishing rod handle and a fishing rod guide are inserted, respectively, and are hingedly opened and closed; a fishing rod handle pouch detachably provided in the first body and storing the fishing rod handle therein; and a fishing rod guide pouch detachably provided in the second body and storing the fishing rod guide therein. At least one end of the fishing rod handle pouch and at least one end of the fishing rod guide pouch are attached to and detached from the first body and the second body by coupling rings, respectively.

The scope of the present disclosure is not limited to embodiments described below, and various modifications can be made by those skilled in the art within the scope of the technical gist of the present disclosure.

Hereinafter, a fishing bag 1 according to an embodiment of the present disclosure will be described in detail with reference to FIGS. 1 to 7.

Figure 1:
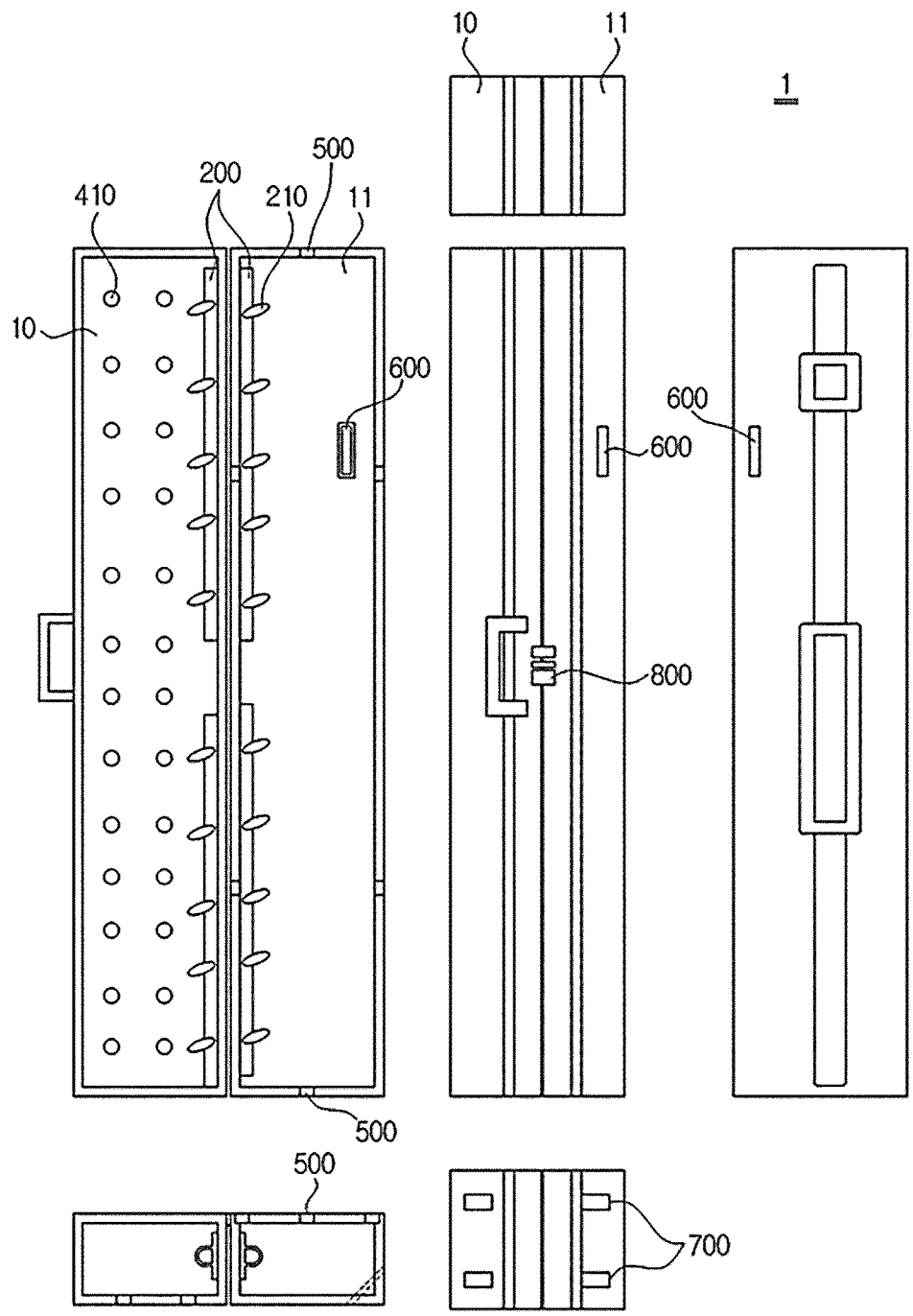
FIG. 1 is an exemplary view illustrating a fishing bag according to an embodiment of the present disclosure.
Figure 2:
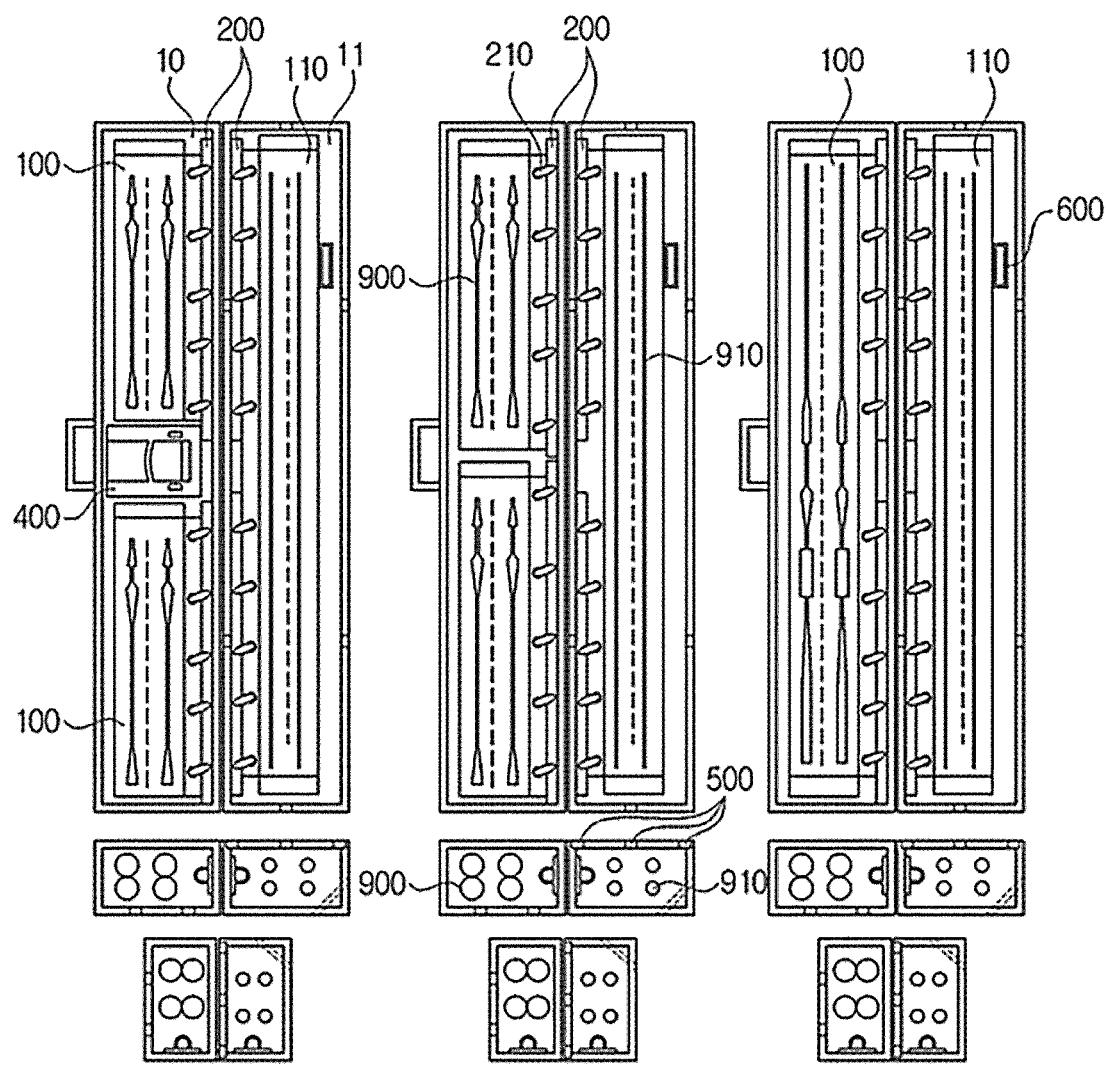
FIG. 2 is an exemplary view illustrating the types of fishing bags according to the shapes of fishing rods according to an embodiment of the present disclosure.

As illustrated in FIGS. 1 and 2, the fishing bag 1 has a space therein in which a fishing rod is stored. The fishing bag 1 is divided into a first body 10 and a second body 11 that have accommodation spaces in which a fishing rod handle 900 and a fishing rod guide 910 are inserted and stored, respectively. The first body 10 and the second body 11 are hingedly opened and closed, and are coupled to each other by a fishing bag magnet 500.

Here, when the first body 10 and the second body 11 are closed to face each other, the first body 10 and the second body 11 are coupled to each other by the fishing bag magnet 500 provided at a position where the first body 10 and the second body 11 come into contact with each other. The closed first body 10 and second body 11 are locked by a main locking device 800 provided on the outside thereof so as not to be opened.

Figure 3:
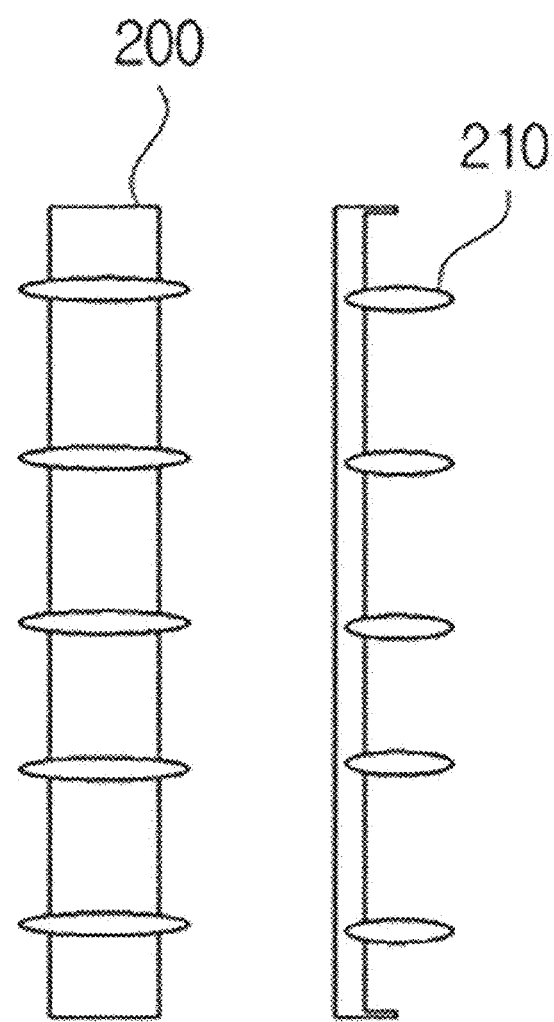
FIG. 3 is an exemplary view illustrating a fishing rod handle and a guide connection member according to an embodiment of the present disclosure.

The first body 10 and the second body 11 are provided with respective connection members 200 therein for coupling a fishing rod handle pouch 100 and a fishing rod guide pouch 110, respectively. As illustrated in FIG. 3, each of the connection members 200 has a bar shape with a plurality of openable coupling rings 210 provided at predetermined intervals along a longitudinal direction thereof. The coupling rings 210 of the connection member 200 are operated in conjunction with the connection member 200. For example, when opposite ends of the connection member 200 are pressed, the coupling rings 210 may opened. Alternatively, when one coupling ring 210 is opened outward from the inside of the ring 210, the remaining coupling rings 210 may be opened together. However, the mechanism for opening and closing the coupling rings 210 is not limited thereto.

As illustrated in FIG. 2, the fishing rod handle pouch 100 in which the fishing rod handle 900 is inserted and stored is detachably provided in the first body 10. The space of the first body 10 may be embodied in a plurality of shapes according to the shape of the fishing rod handle pouch 100. For example, a multi-purpose pouch 400 may be provided in the center, and each fishing rod handle pouch 100 may be provided above and below the multi-purpose pouch 400. Here, when the length of the fishing rod handle 900 is long, one long fishing rod handle pouch 100 may be provided in the first body 10.

The fishing rod guide pouch 110 in which the fishing rod guide 910 is inserted and stored is detachably provided in the second body 11. Similar to the first body 10, the shape of the fishing rod guide pouch 110 may vary depending on the size of the fishing rod guide 910.

The fishing rod handle pouch 100 and the fishing rod guide pouch 110 are attached to and detached from the first body 10 and the second body 11, respectively, by the coupling rings 210. A detailed description of the fishing rod handle pouch 100 and the fishing rod guide pouch 110 will be described hereinbelow.

Figure 4:
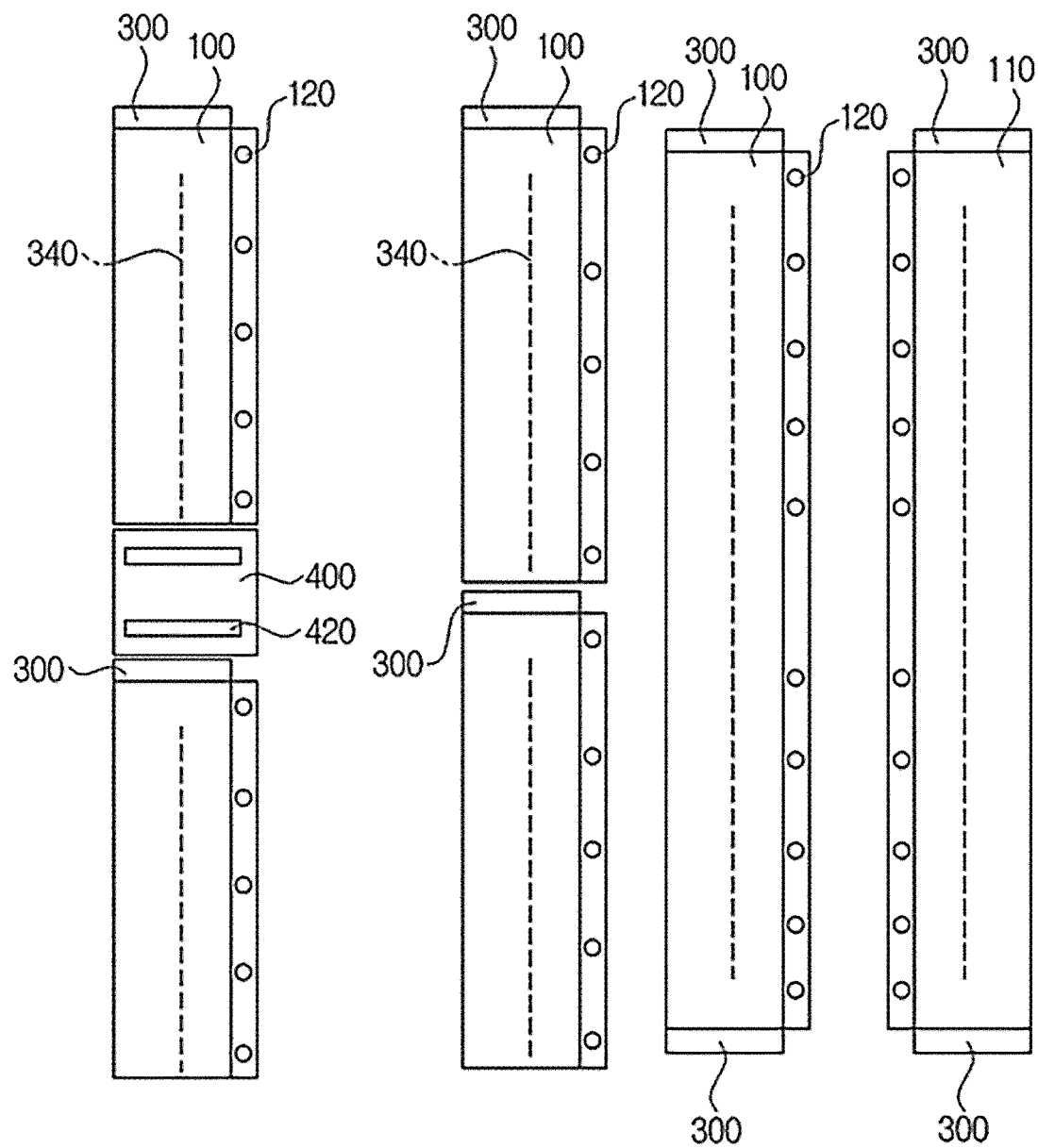
FIG. 4 is an exemplary view illustrating a fishing rod handle, a guide, and a multi-purpose pouch according to an embodiment of the present disclosure.
Figure 5:
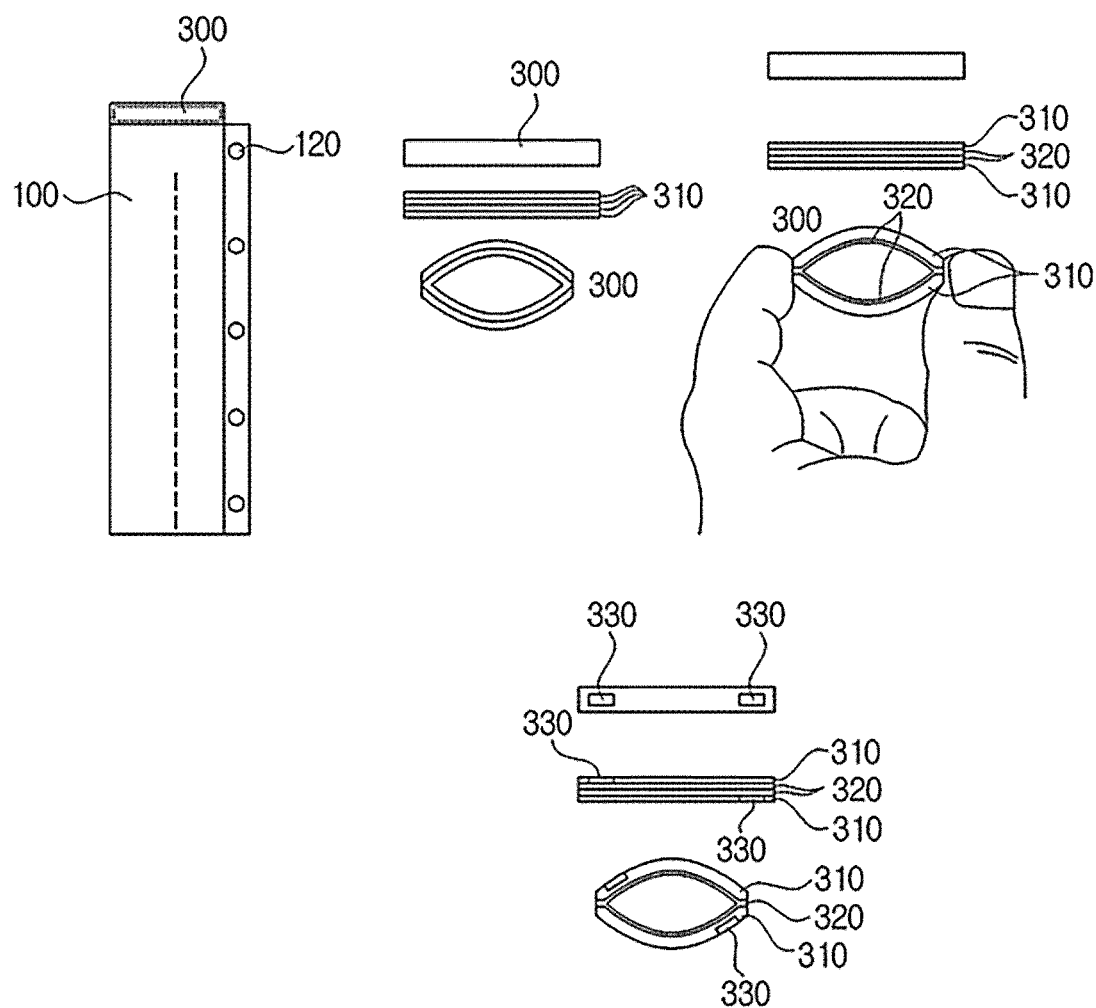
FIG. 5 is an exemplary view illustrating a fishing rod handle, a guide, and a pouch opening/closing member according to an embodiment of the present disclosure.

As illustrated in FIGS. 4 to 5, an opening/closing member 300 is provided on at least one end of each of the fishing rod handle pouch 100 and the fishing rod guide pouch 110. The opening/closing member 300 allows an opening of each of the fishing rod handle pouch 100 and the fishing rod guide pouch 110 to be easily opened and closed with one hand. Each of the fishing rod handle pouch 100 and the fishing rod guide pouch 110 is provided with a partition member 340 to insert a plurality of fishing rod handles 900 or a plurality of fishing rod guides 910 therein. The partition member 340 divides an inner space of each of the fishing rod handle pouch 100 and the fishing rod guide pouch 110 into a plurality of partitioned spaces so that the plurality of fishing rod handles 900 and the plurality of fishing rod guides 910 are inserted and stored in the fishing rod handle pouch 100 and the fishing rod guide pouch 110, respectively.

In addition, a plurality of coupling holes 120 into which the plurality of coupling rings 210 of the connection member 200 are inserted are formed along one side edge of each of the fishing rod handle pouch 100 and the fishing rod guide pouch 110. Each of the fishing rod handle pouch 100 and the fishing rod guide pouch 110 is fastened to the connection member 200 by engagement between the coupling holes 120 and the coupling rings 210. A plurality of fishing rod handle pouches 100 and a plurality of fishing rod guide pouches 110 may be fastened to the respective connection members 200.

As illustrated in FIG. 5, the opening/closing member 300 includes an elastic iron plate 310 having elasticity, a plastic magnet 320, and a magnet 330. In other words, the opening/closing member 300 may be formed by stacking and coupling a plurality of elastic iron plates 310 and plastic magnets 320. The opening/closing member 300 may be formed in various ways, for example, by using the elastic iron plates 310, by using the elastic iron plates 310 and the plastic magnets 320, and by using the elastic iron plates 310 and magnetic plates formed by inserting magnets 330 containing neodymium and having strong magnetism into the plastic magnets 320.

In addition, the opening/closing member 300 is configured such that when opposite sides of the opening/closing member 300 are pressed, an opening thereof is opened due to pressing force, and when the pressing force is released, the opening is closed due to elasticity of the opening/closing member 300. When in use, a user opens the opening of the opening/closing member 300 by pressing the opposite sides thereof, inserts the fishing rod handle 900 or the fishing rod guide 910 into the opening, and closes the opening by removing the pressing force.

Figure 6:
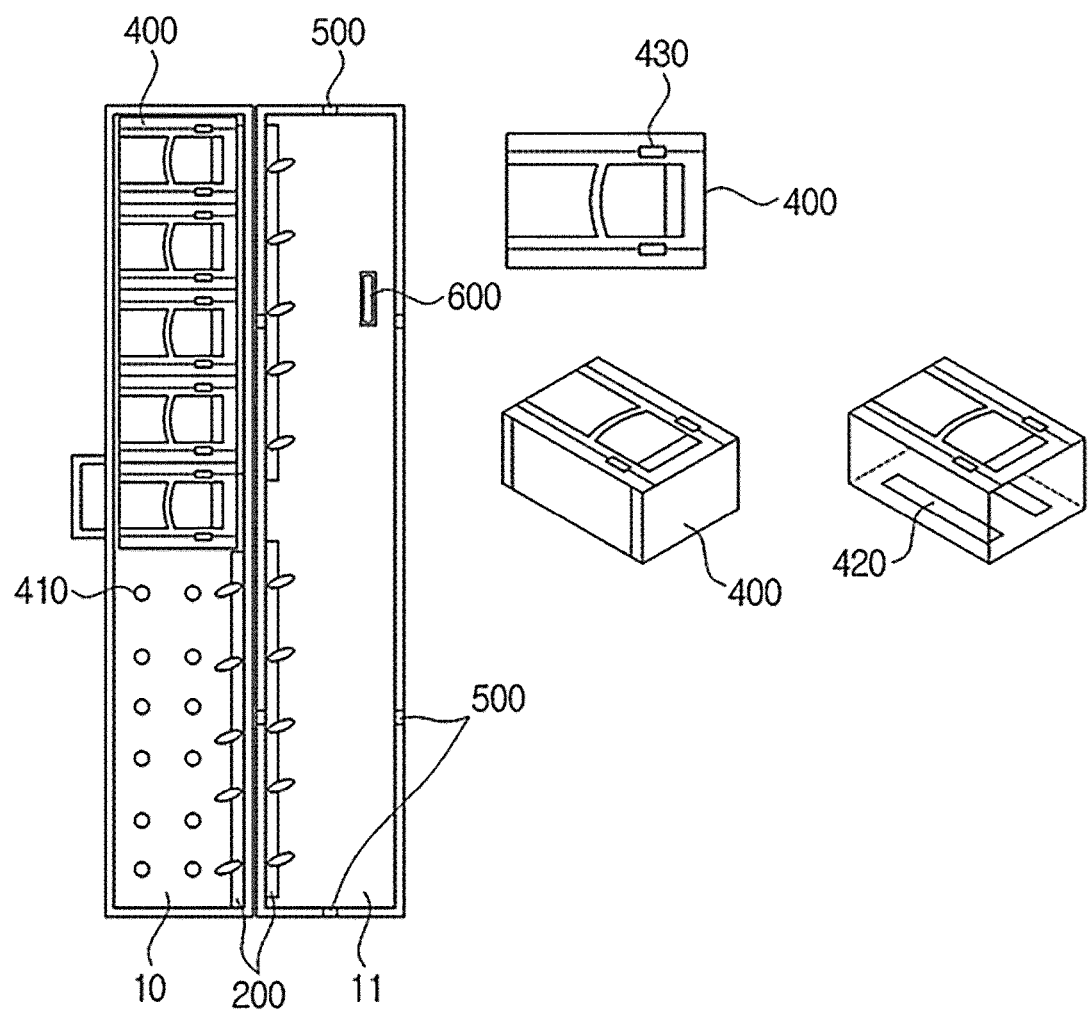
FIG. 6 is an exemplary view illustrating a multi-purpose pouch according to an embodiment of the present disclosure.
Figure 7:
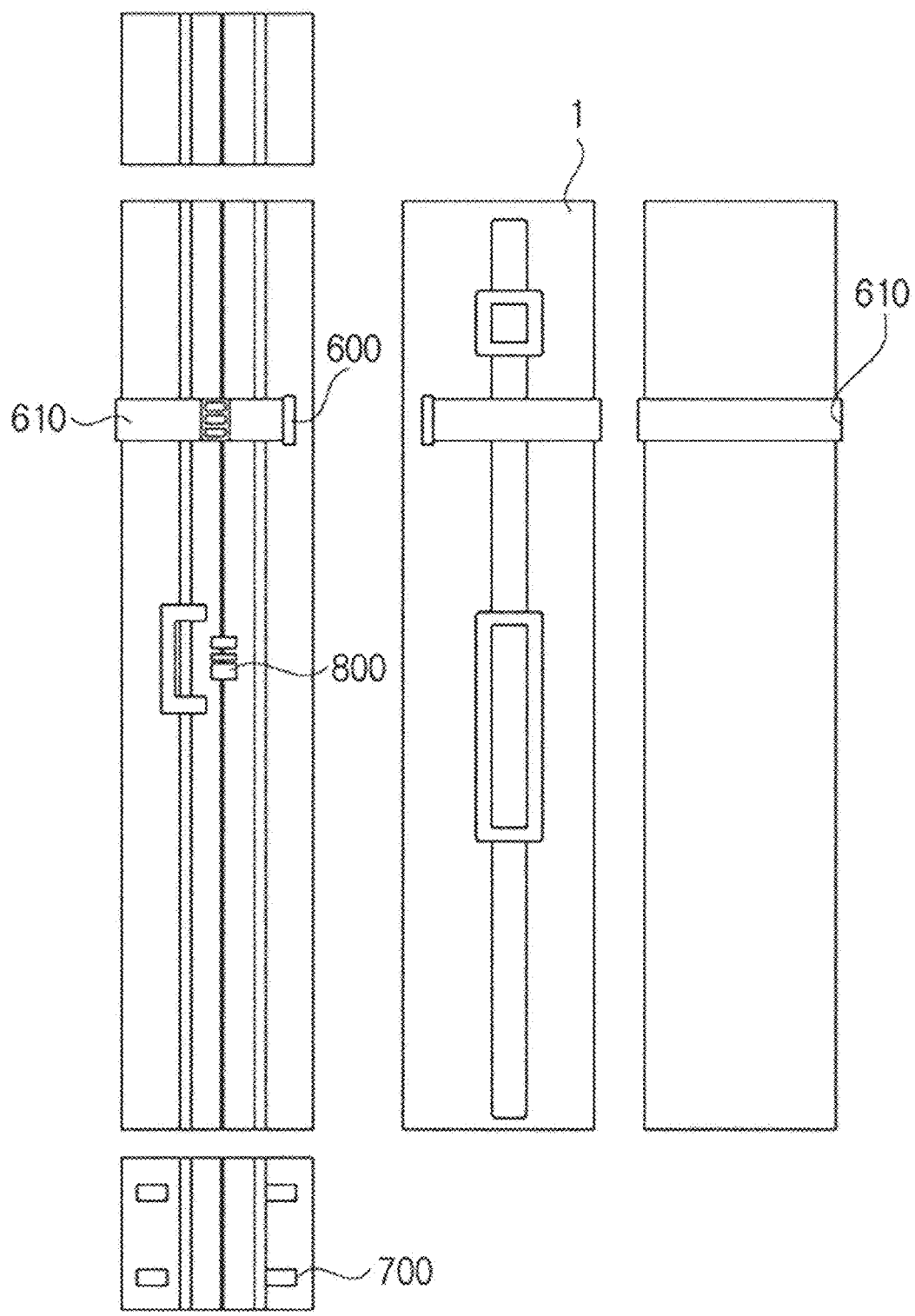
FIG. 7 is an exemplary view illustrating that an anti-opening belt is provided on the fishing bag according to the embodiment of the present disclosure.

As illustrated in FIG. 6, the multi-purpose pouch 400 is formed in a rectangular parallelepiped shape having an inner space and a top surface opened and closed by means of a zipper. In addition, a multi-purpose pouch iron plate 420 having magnetic force is provided on a bottom surface of the multi-purpose pouch 400 to correspond to a multi-purpose pouch circular magnet 410 provided on a bottom surface of the first body 10 so that the first body 10 and the multi-purpose pouch 400 are coupled to each other by magnetic force. In addition, a plurality of multi-purpose pouches 400 may be coupled to the first body 10 to store different contents according to each purpose. Although the multi-purpose pouch 400 is illustrated as a rectangular parallelepiped in FIG. 6, the shape thereof is not limited thereto.

An anti-opening belt insertion hole 600 passing through the second body 11 is formed in the fishing bag 1. An anti-opening belt 610 surrounding the outside of the fishing bag 1 is inserted and fastened into the respective anti-opening belt insertion holes 600. With this configuration, in addition to a coupling function provided by the magnetic force of the first body 10 and the second body 11 and the main locking device 800, an opening inhibiting function is provided so that the fishing bag 1 is inhibited from being opened by an external impact that may occur during air transportation, etc.

In addition, an anti-slip pad 700 is provided on one side of the fishing bag 1 so that when the fishing bag 1 is to be opened while standing on a ground, the fishing bag 1 is inhibited from slipping due to friction with the ground, and the fishing bag 1 stands stably on the ground.

DESCRIPTION OF THE REFERENCE NUMERALS IN THE DRAWINGS

1: fishing bag
10: first body 11: second body
100: fishing rod handle pouch 110: fishing rod guide pouch
120: coupling hole
200: connection member 210: coupling ring
300: opening/closing member
310: elastic iron plate 320: plastic magnet
330: magnet 340: partition member
400: multi-purpose pouch 410: multi-purpose pouch circular magnet
420: multi-purpose pouch iron plate 430: zipper
500: fishing bag magnet
600: anti-opening belt insertion hole 610: anti-opening belt
700: anti-slip pad
800: main locking device
900: fishing rod handle 910: fishing rod guide

The invention claimed is:

1. A fishing bag comprising:
    a fishing bag divided into a first body (10) and a second body (11) that are configured to be hingedly opened and closed;
    a fishing rod handle pouch (100) detachably provided in the first body (10) and configured to store a fishing rod handle (900) therein; and
    a fishing rod guide pouch (110) detachably provided in the second body (11) and configured to store a fishing rod guide (910) therein,
    wherein the first body (10) and the second body (11) are coupled to each other by a magnetic force,
    wherein the first body (10) and the second body (11) are provided with respective connection members (200) to which the fishing rod handle pouch (100) and the fishing rod guide pouch (110) are coupled, respectively,
    wherein each of the connection members (200) has a bar shape with a plurality of openable coupling rings (210) provided at predetermined intervals along a longitudinal direction thereof, and
    wherein when one of the plurality of coupling ring (210) is opened outward from the inside of the ring, remaining coupling rings of the plurality of coupling ring (210) are opened together.

2. The fishing bag of claim 1,
    wherein a plurality of coupling holes (120) into which the plurality of coupling rings (210) are inserted are formed along one side edge of each of the fishing rod handle pouch (100) and the fishing rod guide pouch (110).

3. The fishing bag of claim 1, wherein an opening/closing member (300) is provided on at least one end of each of the fishing rod handle pouch (100) and the fishing rod guide pouch (110) so that an opening of each of the fishing rod handle pouch (100) and the fishing rod guide pouch (110) is opened and closed with one hand, and
the opening/closing member (300) comprises an elastic iron plate (310) having elasticity, a plastic magnet (320), and a magnet (330) so that the opening is opened when opposite sides of the opening/closing member (300) are pressed by pressing force and the opening is closed when the pressing force is released.

* * * * *